United States Patent
Habenicht

(10) Patent No.: US 12,336,557 B2
(45) Date of Patent: *Jun. 24, 2025

(54) DEVICE FOR FLAVORING LIGHTWEIGHT FOOD PRODUCTS

(71) Applicant: Jeffery Allen Habenicht, New York, NY (US)

(72) Inventor: Jeffery Allen Habenicht, New York, NY (US)

(*) Notice: Subject to any disclaimer, the term of this patent is extended or adjusted under 35 U.S.C. 154(b) by 260 days.

This patent is subject to a terminal disclaimer.

(21) Appl. No.: 17/655,714

(22) Filed: Mar. 21, 2022

(65) Prior Publication Data

US 2022/0202049 A1    Jun. 30, 2022

Related U.S. Application Data

(62) Division of application No. 16/524,963, filed on Jul. 29, 2019, now Pat. No. 11,291,228.

(60) Provisional application No. 62/711,584, filed on Jul. 29, 2018.

(51) Int. Cl.
| | |
|---|---|
| *A23G 3/20* | (2006.01) |
| *A21C 9/04* | (2006.01) |
| *A23L 7/122* | (2016.01) |
| *A23L 7/161* | (2016.01) |
| *A23L 7/191* | (2016.01) |
| *G07F 17/00* | (2006.01) |

(52) U.S. Cl.
CPC ............... *A23L 7/191* (2016.08); *A21C 9/04* (2013.01); *A23G 3/2076* (2013.01); *A23L 7/122* (2016.08); *A23L 7/161* (2016.08); *G07F 17/0078* (2013.01)

(58) Field of Classification Search
CPC ....... A23L 7/161; A23L 7/191; A23G 3/2076; A21C 9/04
See application file for complete search history.

(56) References Cited

U.S. PATENT DOCUMENTS

| | | |
|---|---|---|
| 2,843,080 A | 7/1958 | Woodruff |
| 3,536,035 A | 10/1970 | Watkins |
| 3,756,139 A | 9/1973 | Wolens |
| 3,882,255 A | 5/1975 | Gorham, Jr. et al. |
| 4,045,584 A | 8/1977 | Jones et al. |
| 5,514,399 A | 5/1996 | Cordera et al. |

FOREIGN PATENT DOCUMENTS

DE      202012009828 U1 *   1/2013   ............... A23L 1/18

OTHER PUBLICATIONS

DE 202012009898 machine translation. 2013.*

* cited by examiner

*Primary Examiner* — Stephanie A Cox
(74) *Attorney, Agent, or Firm* — Lando & Anastasi, LLP

(57) ABSTRACT

A food product flavoring apparatus is provided. In some embodiments, the apparatus includes a removable container configured to contain a flavor target, a means for agitating the flavor target, and a housing. The housing is configured to receive the agitated flavor target when the removable container is adjacent the housing such that the container opening is aligned with the housing opening. The apparatus further includes a means for applying a flavoring agent to the agitated flavor target a means for removing substantially all residual flavoring agent from the housing after the flavor target has been flavored. A method of applying a flavoring agent to a flavor target is also provided.

18 Claims, 13 Drawing Sheets

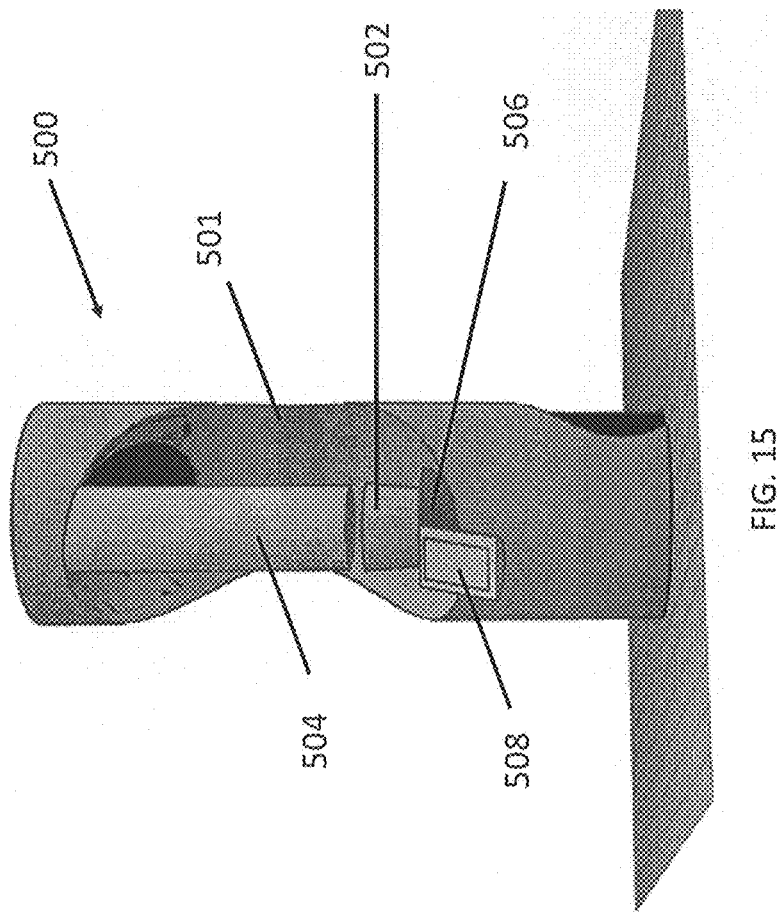

DEVICE FOR FLAVORING LIGHTWEIGHT FOOD PRODUCTS

RELATED APPLICATIONS

This application is a divisional of U.S. application Ser. No. 16/524,963 titled "DEVICE FOR FLAVORING LIGHTWEIGHT FOOD PRODUCTS" filed on Jul. 29, 2019, which claims priority under 35 U.S.C. § 119(e) to U.S. Provisional Application Ser. No. 62/711,584 titled "DEVICE FOR FLAVORING LIGHTWEIGHT FOOD PRODUCTS" filed on Jul. 29, 2018, each of which is incorporated by reference herein in its entirety for all purposes.

TECHNICAL FIELD OF THE DISCLOSURE

The present disclosure relates to the field of devices and methods for flavoring lightweight food products. More specifically, the present disclosure relates to devices and methods allowing the variable flavoring of retail-sized batches of lightweight food products, such as popped popcorn.

BACKGROUND OF THE DISCLOSURE

Americans consume more than thirteen billion quarts of popcorn annually. This consumption takes many forms, including homemade popcorn, prepackaged popcorn, and freshly-prepared retail popcorn. This last category, freshly-prepared retail popcorn, represents a significant portion of annual popcorn consumption and includes popcorn served at any number of venues including theaters, stadiums, and other places of public entertainment.

The prior art has long recognized the benefits of offering customers the additional option of flavored popcorn and various inventions disclose devices for this purpose. These devices, however, are generally large mechanical units suited primarily for mass producing popcorn and imbuing the entire amount with a single, uniform flavor. For example, U.S. Pat. No. 5,514,399 discloses "an apparatus and a method for the topical application of a particulate composition . . . [where] baked good or snack pieces are coated substantially uniformly with the particulate composition on a consistent, continuous, mass production basis." Similarly, U.S. Pat. Nos. 4,045,584 and 2,843,080 disclose mechanical units employing mechanical agitation to flavor popcorn or other food products on a continuous, mass production basis. These devices are best suited to produce prepackaged popcorn products, which can be produced in bulk, well in advance of their consumption, and distributed to various outlets.

SUMMARY OF DISCLOSURE

An aspect of the present disclosure is directed to a food product flavoring apparatus for use with a removable container configured to contain a flavor target. In some embodiments, the apparatus comprises a support structure configured to support a removable container containing a flavor target; an agitation device supported by the support structure, the agitation device being configured to introduce an airflow into the removable container to agitate the flavor target; a housing supported by the support structure, the housing being configured to receive the flavor target when the removable container is placed on the support structure and the agitation device introduces an airflow into the removable container to agitate the flavor target; and a flavoring device supported by the support structure, the flavoring device being configured to apply a flavoring agent to the flavor target.

In some embodiments, the apparatus further comprises a cleaning device configured to remove residual flavoring agent from a portion of the housing.

In some embodiments, the support structure includes a base and the agitation device is secured to the base.

In some embodiments, the flavoring device is configured to apply the flavoring agent to the flavor target while the flavor target is being agitated by the agitation device.

In some embodiments, the apparatus further comprises an opening in the housing to receive a flavor target from a filling device, the housing being configured to direct the flavor target to the removable container when the removable container is supported by the support structure.

In some embodiments, the apparatus further comprises a user interface by which a user may select from a plurality of flavoring agents.

In some embodiments, the housing is configured to sealingly engage with the removable container, prior to the introduction of an airflow into the removable container.

In some embodiments, the agitation device is further configured to heat the airflow being introduced into the removable container.

According to an aspect of the present disclosure, a food product flavoring apparatus comprises a support structure configured to support a removable container containing a flavor target; a removable container configured to contain a flavor target, the removable container having a top opening; an agitation device supported by the support structure, configured to introduce an airflow into the removable container to agitate the flavor target; a housing having a housing opening, the housing being configured to receive the flavor target when the top opening of the removable container is adjacent to the housing opening and the agitation device agitates the flavor target by introducing the airflow into the bottom opening of the removable container; and a flavoring device supported by the support structure and configured to apply a flavoring agent to the flavor target.

In some embodiments, the apparatus further comprise a cleaning device configured to remove residual flavoring agent from at least a portion of the housing.

In some embodiments, the removable container contains a second opening and the agitation device is configured to introduce an airflow into the second opening of the removable container to agitate the flavor target.

In some embodiments, the removable container contains at least one valve and the agitation device is configured to introduce an airflow into the at least one valve of the removable container to agitate the flavor target.

In some embodiments, the flavoring device is configured to apply the flavoring agent to the flavor target while the flavor target is being agitated by the agitation device.

In some embodiments, the apparatus further comprises a filling device configured to add the flavor target to the removable container once the removable container has been received by the support.

In some embodiments, the apparatus further comprises a user interface by which a user may select from a plurality of flavoring agents.

According to an aspect of the present disclosure, a method of applying a flavoring agent to a flavor target is provided, and the method comprises providing a flavor target in a removable container; introducing airflow into the removable container to agitate the flavor target, causing the agitated flavor target to enter a housing; and applying a flavoring agent to the flavor target.

In some embodiments, the method further comprises removing residual flavoring agent from at least a portion of the housing.

In some embodiments, the flavoring agent is applied while the flavor target is agitated.

In some embodiments, the method further comprises, prior to applying the flavoring agent, providing a plurality of flavoring agents from which a user may select which to apply.

In some embodiments, providing a flavor target in a removable container comprises providing the removable container without the flavor target and subsequently adding the flavor target to the removable container.

According to an aspect of the present disclosure, a food product flavoring apparatus for use with a removable container configured to contain a flavor target is provided, and the apparatus comprises a base configured to support a removable container containing a flavor target; an agitation device supported by the base, the agitation device being configured to introduce an airflow into the removable container to agitate the flavor target and to mix the flavoring agent and the flavor target; a housing supported by the base, the housing being configured to receive the flavor target when the removable container is placed on the base; and a flavoring device supported by the housing, the flavoring device being configured to apply a flavoring agent to the flavor target while agitating the flavor target.

In some embodiments, the apparatus further comprises a column extending upwardly from the base radially outwardly from the seat, the column having a column opening for receiving the removable container.

In some embodiments, the apparatus further comprises a cleaning device configured to remove residual flavoring agent from a portion of the housing.

In some embodiments, the agitation device is secured to the base.

In some embodiments, the flavoring device is configured to apply the flavoring agent to the flavor target while the flavor target is being agitated by the agitation device.

In some embodiments, the apparatus further comprises an opening in the housing to receive a flavor target from a filling device, the housing being configured to direct the flavor target to the removable container when the removable container is supported by the base.

In some embodiments, the apparatus further comprises a user interface by which a user may select from a plurality of flavoring agents.

In some embodiments, the removable container has openings to allow airflow into the container from the agitation device.

In some embodiments, the openings are flaps defined in a lower wall of the removable container.

In some embodiments, the apparatus is provided in combination with the removable container, the removable container including a side wall, a lower wall connected to the side wall, and at least one opening defined in the lower wall.

In some embodiments, the at least one opening includes a plurality of openings.

According to an aspect of the present disclosure, a food product flavoring apparatus comprises a removable container configured to contain a flavor target, the removable container having a top opening and at least one valve; an agitation device, configured to introduce an airflow into the at least one valve of the removable container to agitate the flavor target; a housing having a housing opening, the housing being configured to receive the flavor target when the top opening of the removable container is adjacent to the housing opening and the agitation device agitates the flavor target by introducing the airflow into the bottom opening of the removable container; and a flavoring device configured to apply a flavoring agent to the flavor target.

In some embodiments, the apparatus further comprises a cleaning device configured to remove residual flavoring agent from at least a portion of the housing.

In some embodiments, the agitation device is connected to a base.

In some embodiments, the flavoring device applies the flavoring agent to the flavor target while the flavor target is being agitated by the agitation device.

In some embodiments, the apparatus further comprises a filling device configured to add the flavor target to the removable container once the removable container has been received by the support.

In some embodiments, the apparatus further comprises a user interface by which a user may select from a plurality of flavoring agents.

According to an aspect of the present disclosure, a food product flavoring apparatus for use with a removable container is provided, and the apparatus comprises a base configured to receive a removable container containing a flavor target; an agitation device for agitating the flavor target by introducing an airflow into the removable container to agitate the flavor target; a housing having a housing opening, the housing being configured to receive the agitated flavor target when the removable container is at least substantially adjacent the housing; and a means for applying a flavoring agent to the flavor target.

In some embodiments, the apparatus further comprises a means for removing residual flavoring agent from at least a portion of the housing.

In some embodiments, the means for applying a flavoring agent applies the flavoring agent to the flavor target while the flavor target is being agitated by the means for agitating the flavor target.

In some embodiments, the apparatus further comprises a means for adding the flavor target to the removable container once the removable container has been received by the support.

In some embodiments, the apparatus further comprises a user interface by which a user may select from a plurality of flavoring agents.

According to an aspect of the present disclosure, a method of applying a flavoring agent to a flavor target is provided, and the method comprises providing a flavor target in a removable container; applying a flavoring agent to the flavor target; and agitating the flavor target, and causing the agitated flavor target to enter a housing.

In some embodiments, the method further comprises removing residual flavoring agent from at least a portion of the housing.

In some embodiments, the flavor target is agitated by an air flow.

In some embodiments, the flavoring agent is applied while the flavor target is agitated.

In some embodiments, the method further comprises, prior to applying the flavoring agent, providing a plurality of flavoring agents from which a user may select which to apply.

According to an aspect of the present disclosure, a food product flavoring apparatus for use with a removable container is provided, and the apparatus comprises a plurality of supports, each support being configured to receive a removable container containing a flavor target; at least one agitation device, configured to introduce an airflow into the removable container to agitate the flavor target; a plurality of housings, each housing having a housing opening, each housing being configured to receive the flavor target when the removable container is substantially adjacent to the housing opening and the at least one agitation device agitates the flavor target by introducing an airflow into the removable container; and a plurality of flavoring devices, each flavoring device configured to apply a flavoring agent to the flavor target.

In some embodiments, the apparatus further comprises a plurality of cleaning devices, each cleaning device configured to remove residual flavoring agent from a respective one of the plurality of housings.

In some embodiments, each flavoring device is configured to apply a flavoring agent to the flavor target while it is being agitated by the agitation device.

In some embodiments, each flavoring device is configured to apply a flavoring agent to the flavor target while it is being agitated by the agitation device and intermittently entering only one of the plurality of housings.

In some embodiments, the plurality of housings are arranged in a linear array.

In some embodiments, the apparatus further comprises at least one user interface.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. One may derive a more complete understanding of the present disclosure by referring to the detailed descriptions when considered in connection with the following Figures. In the drawings:

FIG. 15 is a perspective view of an embodiment of a flavoring apparatus according to the present disclosure.

DETAILED DESCRIPTION

Figure 1:
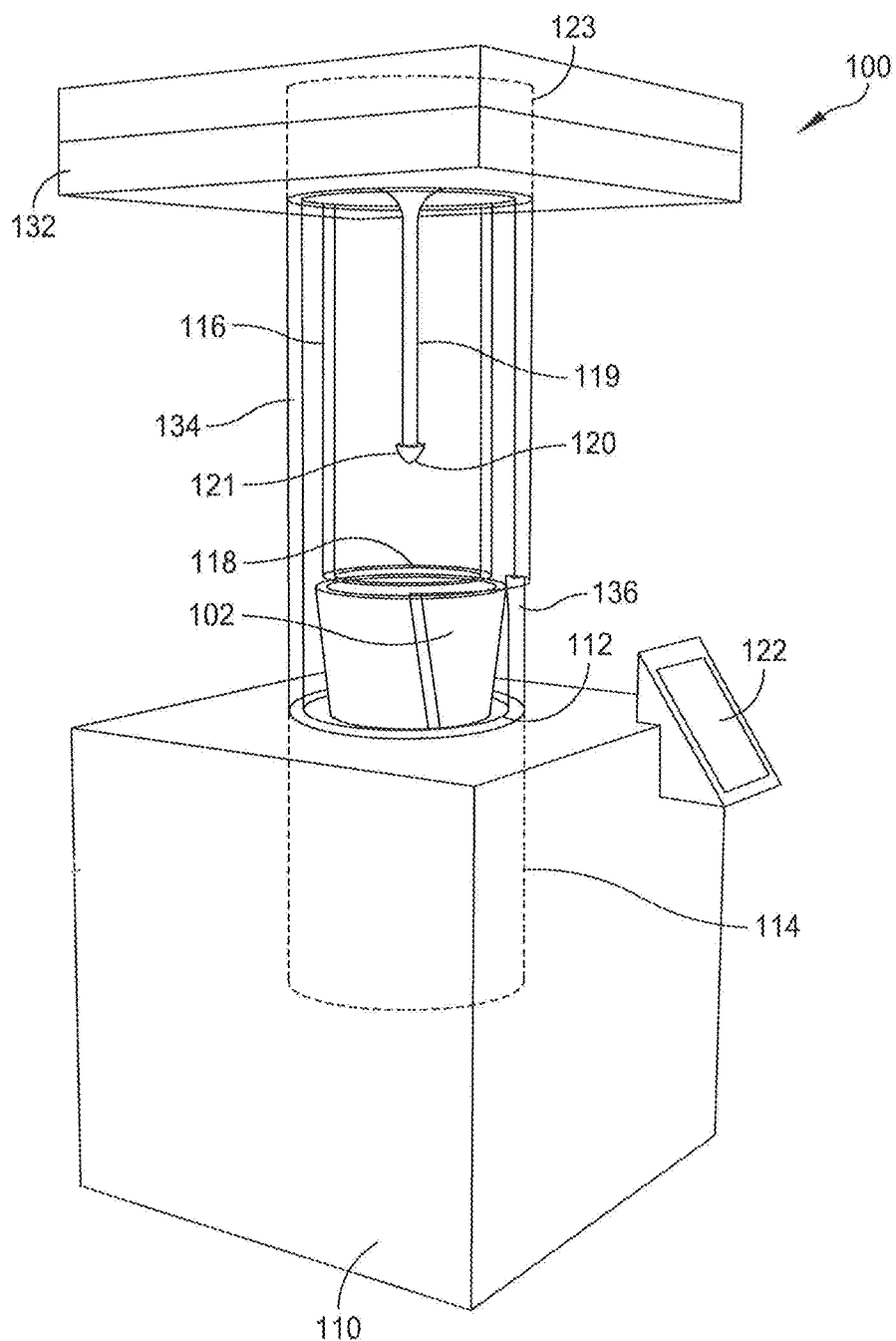
FIG. 1 is a perspective view of embodiment of a flavoring apparatus of the present disclosure.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The present disclosure relates to methods and apparatuses for applying a flavoring agent to a lightweight flavor target. In some embodiments, the lightweight flavor target includes popped popcorn. While some embodiments herein describe combining popped popcorn with one or more flavoring agents, the apparatuses and methods of the present disclosure can be used for flavoring other lightweight flavor targets, such as other lightweight food products. Examples of flavor targets may include lightweight food products such as puffed or popped cereals or grains, puffed or extruded corn snacks, pork rinds, or other lightweight food products.

The present disclosure provides methods and devices for flavoring retail-sized batches of popcorn. For vendors seeking to provide freshly-flavored popcorn, devices and methods of the present disclosure allow for flexibility in flavorings that consumers currently demand. Devices and methods of the present disclosure are configured to produce individualized volumes of a homogeneously flavored popcorn for consumption by a single person or several people. Methods and devices of the present disclosure do not require a retailer to know ex-ante whether a sufficient number of consumers will desire a particular flavor. Methods and devices of the present disclosure do not require a retailer to produce a large volume of homogeneously flavored popcorn in anticipation of consumer demand. Thus, methods and devices of the present disclosure reduce waste because a retailer does not need to discard a large amount of popcorn for lack of demand. Additionally, methods and devices of the present disclosure allow a retailer to provide a first batch of food having a first flavoring agent to a first consumer, to remove residual flavoring agent after the first batch, and then to provide a second batch of food having a second flavoring agent to a second consumer.

One aspect of the present disclosure is directed to a flavoring apparatus for flavoring lightweight food products. In some embodiments, the lightweight food product includes popcorn. The present disclosure provides a flavoring apparatus addressing the current need in the field. The apparatus allows a user to introduce a removable container holding a retail-sized amount (as described below) of lightweight flavor targets by placing the removable container into the apparatus. During a flavoring event, the apparatus uses one or more air flows to agitate the lightweight flavor targets within a housing that is configured to contain the agitated lightweight flavor targets for the purpose of combining said lightweight flavor targets with one or more flavoring agents. Once the lightweight flavor targets are sufficiently flavored or once the flavor targets have been exposed to the flavoring agent(s) for a predetermined period of time, the lightweight flavor targets are again received in the removable container.

In some embodiments, the apparatus prepares itself for a subsequent flavoring event, in part, by removing some, all, or substantially all, of the residual flavoring agent that might come into contact with flavor targets in a subsequent flavoring event from the housing.

Retail sized batches of popcorn may vary widely in sizes, depending on the sales outlet. In some cases, a retail-sized serving of food product may include a pint, a quart, a half-gallon, or a gallon of a food product. In other areas, as is the case of serving sizes of popcorn at many movie theaters, the retail serving sizes may be up to approximately 22 cups in volume, equal to approximately 180 U.S. fluid ounces. Outdoor event vendors may offer even larger sizes.

FIG. 1 illustrates an exemplary embodiment of a flavoring apparatus, generally indicated at 100, in accordance with the present disclosure. The flavoring apparatus 100 is configured to flavor a food product that is contained in the removable container 102. The lower end of the removable container 102 is configured to receive an air flow caused by the flavoring apparatus. The flavoring apparatus 100 may be provided separately from the removable container 102.

The flavoring apparatus 100 includes a support structure including a base 110 and an upper portion 132. The base 110 is configured to sit on a support surface, such as a floor. The base 110 includes a seat 112 to support the removable container 102. An agitation device 114 secured within the base 110 is configured to direct an air flow towards the removable container to aerate popcorn in the removable container while the removable container is on the base. A flavoring housing 116 is secured above the base and includes a housing opening 118 at a lower end of the flavoring housing 116 that is configured to receive aerated popcorn from the removable container. Relative movement of the flavoring housing 116 and the seat 112 towards each other allows the opening 118 to be moved closer to the removable container 102. In some embodiments, the seat 112 may be movable. In some embodiments, the flavoring housing 116 may be moveable, such that the housing opening 118 may sealingly engage the removable container 102. A flavoring device 121 is secured within the flavoring housing. The flavoring device 121 includes a conduit 119 having a first end connected to a storage container 123 containing a flavoring agent and a second end that terminates in a nozzle 120. In this way, the nozzle 120 is secured within the flavoring housing for dispensing a flavoring agent within the flavoring housing 116. The flavoring apparatus 100 further includes a user interface 122 to allow a user to control operation of the flavoring apparatus.

The storage container 123 can include one or more hopper and/or one or more reservoir for containing a flavoring agent. In some embodiments, the storage container 123 includes a device for advancing a flavoring agent from the storage container 123 to the nozzle 120. In some embodiments, the device for advancing the flavoring agent from the storage container 123 is a motor or a pump. In some embodiments, the motor for advancing flavoring agent includes an auger.

The user interface 122 may include a controller and may be connected to the agitation device 114 and a pump to advance flavoring agent through the nozzle 120 in response to one or more inputs from a user received by the interface 122. In some embodiments, the controller can be embedded into the interface.

Generally, to flavor a batch of a food product, a user places the removable container 102 containing the food product onto the seat 112. Because airflow provided by the agitation device may dislodge the container from the seat 112, the removable container is secured in place on the seat. In some embodiments, the removable container may be secured in place on the seat either by operation of the seat 112 or by the housing opening 118 sealingly engaging the removable container. In some embodiments, operation of the seat 112 to secure the removable container may include operation of a clamp on the seat to engage the removable container. In some embodiments, operation of the seat 112 to secure the removable container may include other frictional engagement of the seat with the removable container. In some embodiments, the housing opening 118 may be caused to sealingly engage the removable container 102 by applying a downward force on the housing so that the housing opening applies a downward pressure on the container. The user may operate the user interface 122 to select one or more flavoring agents to be applied to the food product. The agitation device 114 causes at least some of the food product to move into the flavoring housing 116. A flavoring agent is dispensed from the nozzle 120 enclosed in the flavoring housing 116 so the flavoring agent is applied to the food product. After the food product is flavored with the flavoring agent, the agitation device 114 allows the food product to be collected in the removable container 102. The removable container is then released and then the user removes the removable container 102 from the seat. In some embodiments, the removable container is released by operation of the seat 112 or by the housing opening 118 disengaging from the removable container. A subsequent user or the same user can then place a subsequent removable container onto the seat for flavoring another batch of food product.

In one embodiment, the support base 110 may be a standalone base that is configured to be placed on a floor. In other embodiments, the base 110 is configured to be placed on a floor of a restaurant, a movie theater, or another venue. In other embodiments, the base 110 is configured to be placed on a raised surface, such as a countertop, a table, a stand, a shelf, or a cart.

The upper portion 132 is a compartment that is supported above the base 110 by an outer column 134 that extends above the seat 112. The outer column 134 includes a column opening 136 for receiving the removable container 102. A user may move the removable container 102 through the column opening 136 to place the removable container 102 on the seat 112, and the user may then cause the flavoring apparatus 100 to execute a flavoring event in which the flavoring apparatus applies at least one flavoring agent to a food product that is provided in the removable container 102. A user may then remove the removable container 102 through the column opening 136 after the flavoring event.

In one embodiment, the outer column 134 of FIG. 1 is a clear column that allows a user to see the flavoring housing through the column. The outer column 134 supports the upper portion 132 above the seat 112. The outer column 134 has a wall that encircles the removable container 102 and the flavoring housing 116. As shown, the outer column 134 is a cylindrical column; however, in other embodiments, the outer column may have another shape.

Figure 2:
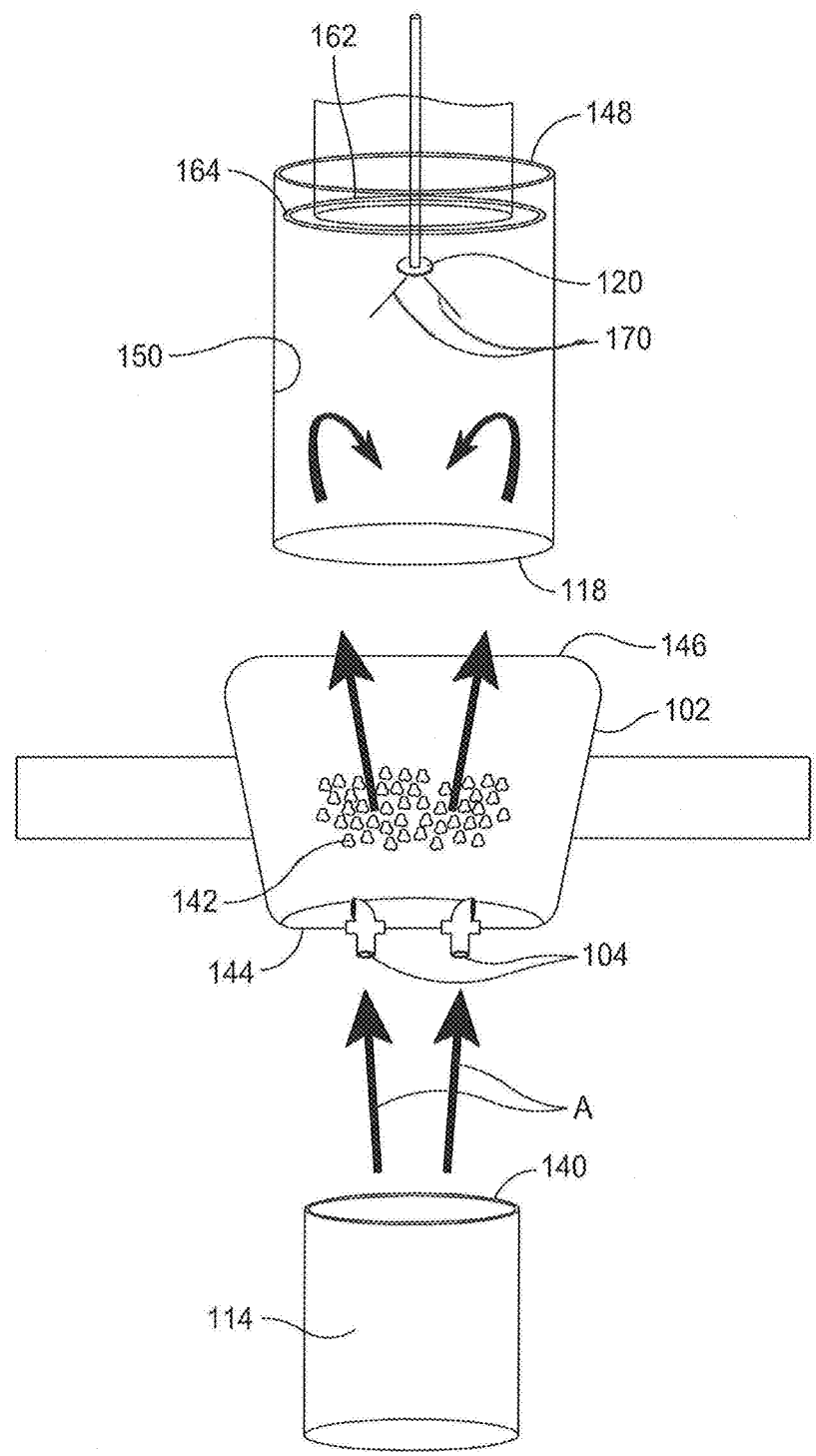
FIG. 2 is an exploded partial schematic view of the flavoring apparatus of FIG. 1.

Regarding to FIG. 2, components of the agitation device 114 of the flavoring apparatus 100 are shown in greater detail. At least one fastener secures the agitation device 114 within the support base 110, beneath the seat 112. The agitation device 114 includes an upper end 140 that is configured to direct an airflow along arrows A toward the seat 112. When the popped popcorn 142 is in the removable container 102 and the removable container 102 is resting on the seat 112, the popped popcorn 142 is then agitated by the agitation device 114, which introduces an airflow along arrows A into the removable container 102 through the valves 104 of the removable container 102. The airflow along arrows A expands the volume of the popped popcorn 142, moving the popcorn 142 at least intermittently into the flavoring housing 116.

In some embodiments, the agitation device 114 is a fan or blower, configured to connect to the bottom of the removable container 102 in order to introduce air flows along arrows A. In other embodiments, the air flows along arrow A may be caused by different means for generating air flows. For example, a vacuum or other negative air pressure may be introduced from above the housing 116 which causes a similar expansion of the volume of space occupied by the agitated popped popcorn 142, causing the popcorn 142 to move at least intermittently into the housing 116. In other embodiments, the one or more air flows along arrows A may be caused by a vacuum pump which is located at the top of the housing 116.

In some embodiments, the agitation device 114 contains a heating element, configured to heat the air flows introduced into the removable container 102. The heating element may be powered by different heat sources, including gas or electric. In some embodiments the heating element may include a panel heater, a ceramic heater, an infrared heater, or a radiant heater. In some embodiments the heating element may be an electric duct heater. The heated air flows introduced into the removable container 102, in addition to agitating the popped popcorn, have the added benefit of heating the popcorn, resulting in an improved consumer experience for consumers who desire heated popcorn.

In some embodiments, one or more air flows may be introduced at the junction of the removable container 102 and the housing 116. In some embodiments, one or more air flows may be introduced in the housing 116 by valves located in the walls of the housing 116.

Referring to the removable container 102, the removable container 102 may be configured to contain various retail-sized portions of a food product. In some embodiments, the retail-sized portion is a single serving of a food product. In some embodiments, the retail-sized portion is several servings of a food product. In some embodiments, the food product is popped popcorn 142. In some embodiments, the removable container 102 is configured to contain a single serving of popcorn 142. In some embodiments, the removable container 102 is configured to contain several servings of popcorn 142.

The removable container 102 may be made of various materials. In some embodiments, the removable container 102 is made of metal, plastic, glass, paper, paperboard, corrugated cardboard, and/or another material. In some embodiments, the removable container 102 includes grease-proof paper board.

Figure 3:
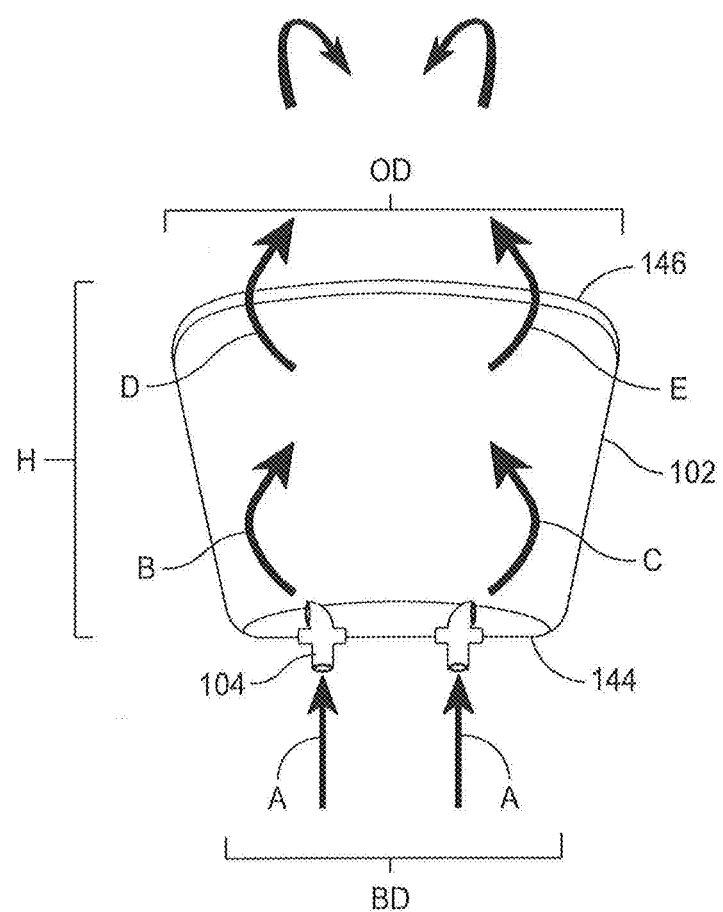
FIG. 3 is a sectional perspective of a removable container for use with the flavoring apparatus of FIG. 1.

In FIG. 3, the removable container 102 is a bucket with an opening diameter OD, a height H, and a bottom diameter BD. In some embodiments, the bucket has an opening diameter OD of 9 inches, a height H of 8.5 inches, and a bottom diameter BD of 6.5 inches and a volume of approximately 170 fluid ounces. In other embodiments, the removable container 102 may be different sizes. In some embodiments, the removable container 102 may take various shapes, including cylinders, tapered cylinders, boxes, and/or other shapes.

The valves 104 are located at a lower end 144 of the removable container 102 and are configured to receive one or more air flow from the agitation device 114. In some embodiments, only one valve 104 is included at the lower end 144 of the removable container 102. In some embodiments, a plurality of valves 104 are included at the lower end 144 of the removable container.

A user can introduce a food product into the interior of the removable container 102 via an open upper end (a top opening) 146 of the removable container 102. Once the popped popcorn, or other flavor targets, has been introduced into the removable container 102, and the open upper end 146 of the removable container 102 is adjacent to the housing opening 118, the popcorn is agitated by one or more air flows along arrows B, C, D, E. These air flows along arrows B, C, D, E may be created by the introduction of one or more air flows along arrows A from beneath the removable container 102. FIG. 2 shows an embodiment of the removable container 102 with valves 104 which allow the introduction of one or more air flows from beneath the popped popcorn 142. These air flows A then agitate the popped popcorn 142, expanding the volume of space occupied by the popped popcorn 142 and causing the popped popcorn 142 to move at least intermittently into the housing 116 through the housing opening 118 that is adjacent the open upper end 146 of the removable container 102. The number, position, and configuration of the valves 104, along with variations in flow rate created by the agitation device 114, may serve to alter the pattern of the air flow A agitating the popped popcorn 142 in the various embodiments of the flavoring apparatus 100.

For example, in some embodiments, the air flows B, C, D, E may agitate the popped popcorn 142 by forcing the popcorn 142 to move in a spiral pattern, rising and falling in the housing 116 by configuring the valves 104 to introduce air flows moving upward in a spiral pattern around a cylindrical inner surface 150 of the housing 116. In other embodiments, the air flows may be directed vertically, creating vertical columns of air flow that agitate the popped popcorn 142 up and down, entering at least intermittently into the housing 116.

In some embodiments, the valves 104 are one-way valves that allow the introduction of air flows A while preventing popped popcorn 142 from escaping through the valves 104. One or more types of valves 104 may be used. For example, a normally closed aspiration valve may be used. In some embodiments, the valves are one-way valves. These one-way valves can be further modified to alter direction and intensity of air flow, for the purpose of adjusting the air flows. In some embodiments, the valves 104 may simply be openings or holes incorporated into the removable container 102, providing an opening for the introduction of air currents. In some embodiments, the valves 104 are made from paper. In some embodiments the valves 104 are cut into the removable container 102, possibly by the agitation device 114. In some embodiments, the valves 104 are connected to the agitation device 114 and inserted into openings in the removable container 102. In some embodiments, the valves 104 will also prevent a flavoring agent from escaping the removable container through the valves 104.

A user may place the removable container 102 on the seat 112 when the user would like to operate the flavoring apparatus 100 to apply a flavoring agent to unflavored popped popcorn 142 contained in the removable container 102. The user may then cause the apparatus 100 to initiate a flavoring event. Following a flavoring event, the removable container 102 can be removed from the seat 112 and replaced with a new removable container 102, containing unflavored popped popcorn, or alternatively the popped popcorn 142 can be replaced in the same removable container 102 with new popped popcorn, and the flavoring process can be repeated.

In some embodiments, the flavoring agent may be added to the popped popcorn 142 by the flavoring nozzle 120 before the popped popcorn 142 is agitated, while it is still in the removable container 102. In some embodiments, the flavoring agent may be added to the popped popcorn 142 by the flavoring nozzle 120 while it is being agitated and entering, at least intermittently, the flavoring housing 116.

The removable container 102, may be introduced to the flavoring apparatus 100 already full of popcorn 142. Or alternatively, the removable container 102 may be filled with popcorn 142 once the removable container 102 has been introduced into the flavoring apparatus 100. In the embodiment in FIG. 1, this latter option may be achieved by inputting popcorn 142 from an open upper end 148 of the housing 116. In some embodiments, the flavoring apparatus 100 may be combined with a popcorn dispenser to provide an all-in-one popcorn vending machine. In this embodiment, the machine could dispense the removable container, fill it with popcorn, and flavor said popcorn, although not necessarily in that order. The dispensation of the popcorn could occur by a gravity fed means, for example like that disclosed in U.S. Pat. No. 3,882,255A. In one embodiment, a popcorn holding container could be located above the housing 116. Then, once an empty removable container 102 has been introduced into the flavoring apparatus, a valve could be activated, allowing popcorn to flow from the popcorn holding container down into the housing 116 and ultimately into the removable container 102. In another embodiment, the popcorn holding container may serve more than one flavoring apparatuses, such that a central holding container could be connected to multiple apparatuses via multiple valves and connectors. Alternatively, the apparatus may use air flows to move popcorn into the removable container 102 or the housing 116. In one embodiment, a popcorn holding container could be connected to the flavoring apparatus through a tube, configured such that the apparatus generates an air current along the tube, flowing from the holding container to the flavoring apparatus, to transport the popcorn from the holding container to the flavoring apparatus. The all-in-one popcorn machine may also pop the popcorn, storing it until used. The popcorn could be popped through various means, including heated air, heated oil, and microwaves.

Some embodiments may include a separate stage where a filling device fills the removable container 102 with the popped popcorn 142 before the removable container 102 is moved adjacent to the housing 116.

At the end of a flavoring event, the removable container 102 may be removed from the flavoring apparatus 100. A benefit of the ability to remove the removable container 102 in some embodiments is that it can prevent the undesired intermingling of dissimilar flavoring agents. For example, in possible embodiments where multiple flavoring agents are employed, if a first flavoring agent is used in a flavoring event, a different removable container 102 may be introduced if the subsequent flavoring event will use a second flavoring agent that is incompatible with the first flavoring agent. Another benefit of the ability to remove the removable container 102 is that the removable container can further serve the purpose of containing the flavored popped popcorn 142 while it is consumed. In some embodiments, the removable container 102 may be a single use container that is kept by the ultimate consumer after the flavoring event. In some embodiments, the removable container 102 is a container configured as a novelty keepsake. In some embodiments, the removable container 102 is disposable. Where the consumer keeps the removable container 102, this prevents the undesired intermingling of dissimilar flavoring agents, because each removable container 102 will generally only be exposed to one flavoring event. The user need not change removable containers 102 between flavoring events. If the user wishes to avoid the undesired intermingling of dissimilar flavoring agents, the user can remove the container after a single flavoring event. If the user wishes to use the same container without the undesired intermingling of dissimilar flavoring agents, the user can purge the container of residual flavoring agent between flavoring events. The user may also choose to expose the same flavor targets to multiple flavoring events.

The lower end 118 of the flavoring housing 116 is configured to receive the popped popcorn 142 when the open upper end 146 of the removable container 102 is substantially adjacent to the housing opening 118 and when the agitation device 114 creates a sufficient air flow, such as along arrows B, C, D, E, through the removable container 102. In some embodiments, the lower end 118 sealingly engages the open upper end 146 of the removable container 102.

As the popped popcorn 142 is agitated by the air flow B, C, D, E, and while the popped popcorn 142 at least intermittently enters the housing 116, the popped popcorn 142 is combined with a flavoring agent 170 introduced by a flavoring device that includes the nozzle 120. This is referred to herein as a flavoring event. Once the popped popcorn 142 is satisfactorily combined with the flavoring agent 170, the airflow A from the agitation device 114 is removed and the flavored popped popcorn 142 is allowed to return, for example due to gravity, to the removable container 102. As discussed in more detail below, the cleaning device 162 removes residual flavoring agent on the inner surface 150 of the housing 116 that might come into contact with flavor targets in a subsequent flavoring event. In some embodiments, the cleaning device 162 removes substantially all residual flavoring agent on the inner surface 150 of the housing 116 that might come into contact with flavor targets in a subsequent flavoring event. In some embodiments, the cleaning device 162 has a substantially circular outer edge 164 that engages the inner surface 150 of the housing 116.

FIG. 2 shows a flavoring agent 170 being dispensed from the nozzle 120. In other embodiments, the flavoring agent may be introduced by a flavoring device having another structure.

The flavoring agent may be either a liquid or a solid or a combination of the two. In some embodiments, liquid flavoring agents may be used, including liquids such as plant-based oils, for example vegetable oil or coconut oil, or melted butter. These liquid flavoring agents may also be flavored, for example chili oil or other aromatic oils. In some embodiments, non-liquid flavoring agents may be used, for example salt, pepper, spices, or other flavor-imparting substances. Other non-liquid flavoring agents include aromatic agents in granular form or other granular agents such as granulized cheese or powdered flavorings. The size of non-liquid flavoring agents may vary and may include powder, chunks, flakes, or other forms. In some embodiments, the flavoring agent 170 may be a combination of both liquid and non-liquid flavoring agents. In some embodiments, the user of the apparatus may be able to select incrementally or otherwise, which of the liquid or non-liquid agents to include in the flavoring agent 170.

As noted above, in some embodiments, the flavoring agent 170 is introduced into the popped popcorn 142 before the popped popcorn 142 is agitated.

In some embodiments, the popped popcorn 142 is combined at least substantially homogeneously with the flavoring agent 170. However, this need not be the case. A heterogeneous distribution of the flavoring agent 170 on the popped popcorn 142 may be preferable as it allows for a favorable flavor experience. The degree of homogeneity of the distribution of the flavoring agent 170 can be affected by the degree of agitation of the popped popcorn 142 resulting from the one or more air flows, such as air flows along arrows B, C, D, E, as well as the location of the flavoring device, such as nozzle 120. The homogeneity will also be affected by the flavoring agent 170, depending on whether a liquid or non-liquid agent is employed and the viscosity or size of said agent.

In embodiments in which the flavoring agent is a viscous seasoning, air nozzles positioned adjacent to slurry nozzles direct and atomize the slurry to evenly apply the flavoring agent. In other embodiments, a means for dropping powdered flavoring material and liquid flavoring material can be used as a means for introducing a flavoring agent onto popped popcorn. In some embodiments, a flavoring head may be connected to a supply tube to dispense a flavoring agent.

A flavoring device for introducing a flavoring agent may be a gravity-fed feed operated by an adjustable valve, motor, or pump. The dispensation of solid flavoring agent may be accomplished through the use of compressed air, which may serve the purpose of expelling the flavoring agent, atomizing it, or more evenly distributing it. Liquid flavoring agents may similarly be introduced in a number of ways. Pressurized liquid may be distributed through the use of a nozzle, which may disperse the flavoring agent evenly. The liquid may also be simply dripped into the housing 116, by means of gravity, employing an adjustable valve, motor, or pump. Compressed air may also be used to distribute the liquid flavoring agent. The invention may also employ electrostatic techniques to the flavoring process, by which an electrostatic charge is applied to the flavoring agent for the purpose of improving coating of the flavor target.

In FIG. 1, the flavoring device includes the nozzle 120 that is located within the housing 116 and depending downwardly from the upper end 148 of the housing 116. In this embodiment, the flavoring agent 170 is released from the nozzle 120 of the flavoring device substantially away from the air flow along arrows B, C, D, E. The benefit of this embodiment is that the nozzle 120 is less likely to become contaminated with a particular flavoring agent 170, thus minimizing the need to clean the nozzle 120 in order to reduce an undesirable flavor experience by the user. However, in other embodiments of the apparatus 100, the flavoring agent 170 may be introduced by different means for introducing a flavoring agent. Such embodiments may include, for example, where the flavoring agent is introduced into the removable container by means of a current of air. In some embodiments, the flavoring agent is introduced within the housing. In some embodiments, the means for introducing the flavoring agent is comprised of multiple components and distributed at different points in the apparatus. There may also be benefits to introducing flavoring agents at the same time from multiple locations, thereby achieving a more homogenous coating of the flavor target.

Once the popped popcorn 142 is satisfactorily flavored, it is returned to the removable container 102. In some embodiments, this return is affected by the removal of the one or more air flows B, C, D, E which then allows gravity to return the popped popcorn 142 to the removable container 102. However, the return may be affected by alternative means, including air flows or mechanical manipulation, such as a tilting or shaking of the apparatus or a mechanical appendage.

In embodiments employing multiple flavoring agents, at some point between a first flavoring event in which a flavor target in a first removable container is flavored with a first flavoring agent and a subsequent second flavoring event in which a second flavor target in a second removable container is flavored with a second flavoring agent, it may be beneficial to remove residual flavoring agent connected with the first flavoring event that might come into contact with flavor targets in a subsequent flavoring from the housing 116. This is intended to prevent an undesirable flavoring event resulting from the undesired intermingling of dissimilar flavoring agents. As such, it is beneficial where the apparatus removes sufficient flavoring agent that might come into contact with flavor targets in a subsequent flavoring event to prevent an undesirable flavoring event. In the embodiment in FIG. 1, the need to remove the residual flavoring agent 170 is generally limited to the housing 116 because the removable container will not need to have any residual flavoring agent removed either if a new removable container 102 is used for each flavoring event or if the removable container 102 is only used for flavoring events employing the same flavored flavoring agent 170. The remaining components of the apparatus generally will not accumulate enough residual flavoring agent 170 or come in contact with the agitated popped popcorn 142 to cause an undesirable flavor experience.

In some embodiments employing multiple flavoring agents, it may be beneficial to remove substantially all residual flavoring agent connected with the first flavoring event that might come into contact with flavor targets in a subsequent flavoring from the housing 116.

In embodiments employing only a single flavoring agent, it may still be beneficial to remove substantially all residual flavoring agent connected with a first flavoring event that might come into contact with flavor targets in a subsequent flavoring event. These benefits may include, for example, aesthetics and hygiene.

Between flavoring events residual flavoring agent 170 is removed by the cleaning device 162 configured to remove residual flavoring agent that might come into contact with flavor targets in a subsequent flavoring event from the housing. In the embodiment depicted in FIG. 1, this cleaning device 162 that is configured to remove residual flavoring agent that might come into contact with flavor targets in a subsequent flavoring event from the housing is a mechanical device that moves along at least some portion of the inner surface 150 of the housing 116 and removes residual flavoring agent 170 from said surface. In some embodiments, this mechanical device may be a squeegee, comprising a resiliently flexible and compressible material formed substantially to the dimensions of the housing 116. In some embodiments, the dimensions of this mechanical device may be reconfigured from time to time. For example, the squeegee, comprising a resiliently flexible and compressible material may be stored during periods of non-use in a compressed form—either by compressing the material, altering its shape, or a combination of the two—and then reconfigured prior to use so as to be formed substantially to the dimensions of the housing. This would remove residual flavoring agent 170, potentially dispensing it into the removable container 102 or, alternatively, being purged of said residual flavoring agent by a device to collect the residual flavoring agent, such as an absorbent material or a vacuum. In some embodiments, the mechanical device may be a cloth, a sponge, or other absorbent material. These materials could similarly be formed substantially to the dimensions of the housing 116 and may be variably configured at different stages in the apparatus's operation. In some embodiments, the cleaning device 162 may be a device that employs one or more air flows to remove any residual flavoring agent 170. Such a device would traverse at least some length of the housing 116 and generate air currents to remove residual flavoring agent. Such residual flavoring agent may be deposited in the removable container 102, further improving to the flavor experience of the user. Or alternatively, the residual flavoring agent 170 may be collected, as disclosed above, by an absorbent material or a vacuum.

It may be beneficial to coat various components of the apparatus 100, including, among others, the housing 116, the flavoring device including the nozzle 120, and/or the cleaning device 162 for removing residual flavoring agent, with a non-stick coating to minimize the adhesion of the flavoring agent. Such a coating, for example polytetrafluoroethylene (sold under the brand name Teflon® by Chemours), would allow an improved cleaning experience and minimize undesired intermingling of dissimilar flavoring agents between flavoring events. One example of said non-stick coating is polytetrafluoroethylene, but different alternatives would be known to one of skill in the art.

In an embodiment of the present disclosure, the one or more air flows B, C, D, E may be configured such that flavoring agent 170 is substantially prevented from contacting the inner surface 150 of the housing 116, thereby eliminating the need to remove any residual flavoring agent 170. Such a configuration is accomplished by varying the air flows in such a way that the currents of air encapsulate the popped popcorn 142 while it is moving at least intermittently into the housing 116. For example, air curtains formed by horizontal air streams can be used to enclose a space within the air curtains. In some embodiments, these curtains of air are used to reduce friction between the inside of a conveying tube and what is being conveyed. This same principle can be applied to minimize contact between the flavoring agent 170 and the housing 116 during a flavoring event, thereby minimizing the need to remove residual flavoring agent.

In some embodiments, the apparatus may be operated by the user interface 122 connected to the apparatus. Through such a user interface 122, the user, whether the ultimate consumer or not, may select which of the different flavors they wish to have their popped popcorn 142 flavored with. Via this user interface 122, the user may also select the degree of flavor. The apparatus and user interface 122 may also be configured to allow the user to create custom flavors, possibly by the combination of different flavoring agents 170 available in the apparatus. The user interface may comprise a computer configured to control the apparatus.

In some embodiments, the user interface 122 may also accept payment from customers, dispensing with the need for continual management of a popcorn-dispensing business.

Figure 4:
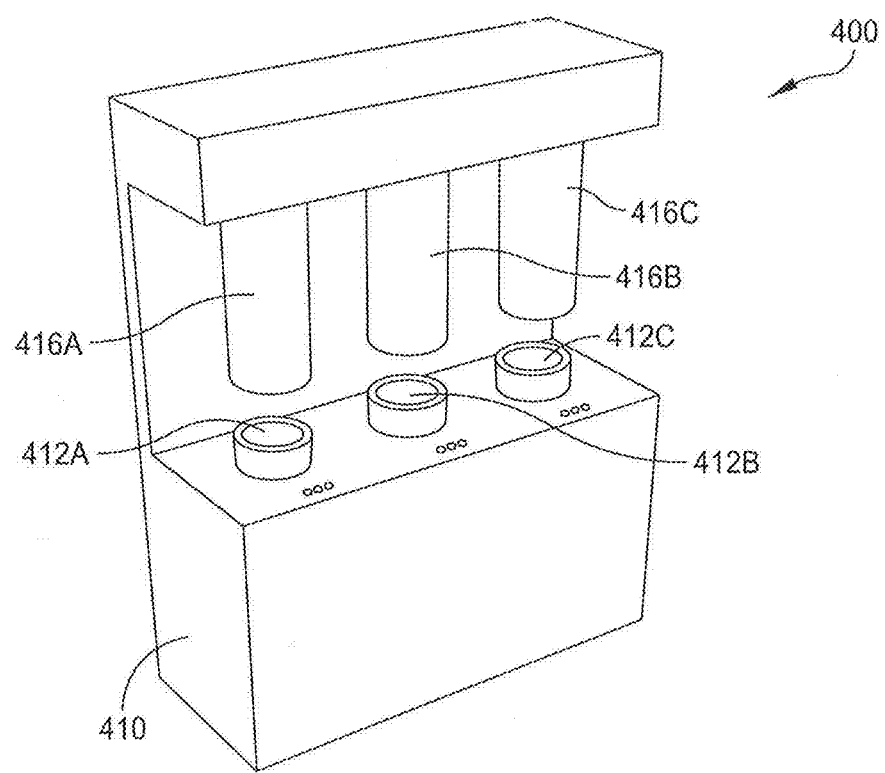
FIG. 4 is a perspective view of another embodiment of a flavoring apparatus of the present disclosure.

According to an aspect of the present disclosure, multiple flavoring apparatuses as described in relation to FIGS. 1-3 may be provided in a single unit, an example of which is generally indicated at 400 in FIG. 4. The single unit 400 includes three flavoring apparatuses that have a unitary support structure 410, but that are otherwise identical to the flavoring apparatus of FIGS. 1-3. The first flavoring apparatus includes a seat 412A and a flavoring housing 416A. The second flavoring apparatus includes a seat 412B and a flavoring housing 416B. The third flavoring apparatus includes a seat 412C and a flavoring housing 416C. The three flavoring apparatuses may be independently operated by a user. In some embodiments, the array of flavoring apparatuses allows a plurality of consumers to simultaneously flavor a respective food product. In some embodiments, each flavoring apparatus in the array of flavoring apparatuses is dedicated to flavor a food product with a single flavoring agent or a single combination of flavoring agents. In some embodiments, each flavoring apparatus in the array of flavoring apparatuses is configured to allow a user to select one or more flavoring agents to be applied to a food product in the removable container.

Figure 5:
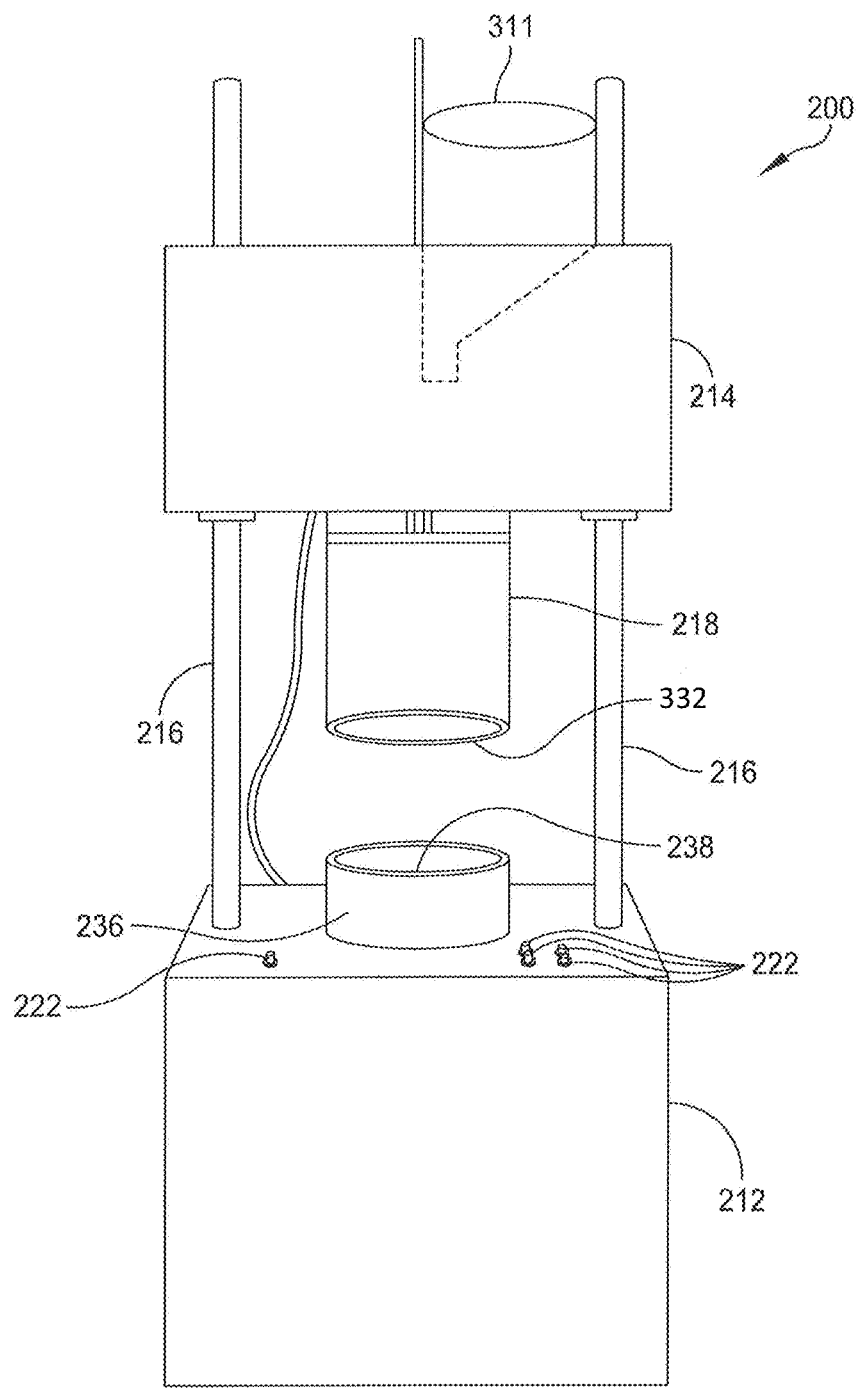
FIG. 5 is a perspective view of another embodiment of a flavoring apparatus according to the present disclosure.

FIG. 5 illustrates an exemplary embodiment of a flavoring apparatus, generally indicated at 200. The flavoring apparatus 200 includes a support structure. The support structure includes a base 212 and an upper body 214. The base 212 sits on a support surface, such as a floor or countertop. The base 212 is configured to support a removable container that contains popcorn. The agitation device in the base 212 is configured to agitate the popcorn in the removable container while the removable container is seated on the base 212. The upper body 214 is slidably secured to posts, each indicated at 216, that extend upwardly from the base 212. The upper body 214 is configured to support at least one reservoir and/or hopper for containing a flavoring agent. A flavoring housing 218 extends downwardly from the upper body 214. The flavoring housing 218 is configured to sealingly engage an upper end of the removable container, so that the agitated popcorn is contained by the removable container and the housing 218 when the agitation device of the base 212 agitates the popcorn. Although the agitation device is shown in the base in FIG. 5, in other embodiments the agitation device can be located in another part of the support structure.

To control the operation of the apparatus 200, a user interface includes control buttons 222. A user can operate the user interface, for example by pressing buttons 222, to turn the apparatus 200 on, to cause the agitation device in the base to agitate the popcorn, and/or to control the application of flavoring agent to the popcorn. In some embodiments, the user interface may include a display.

Figure 6:
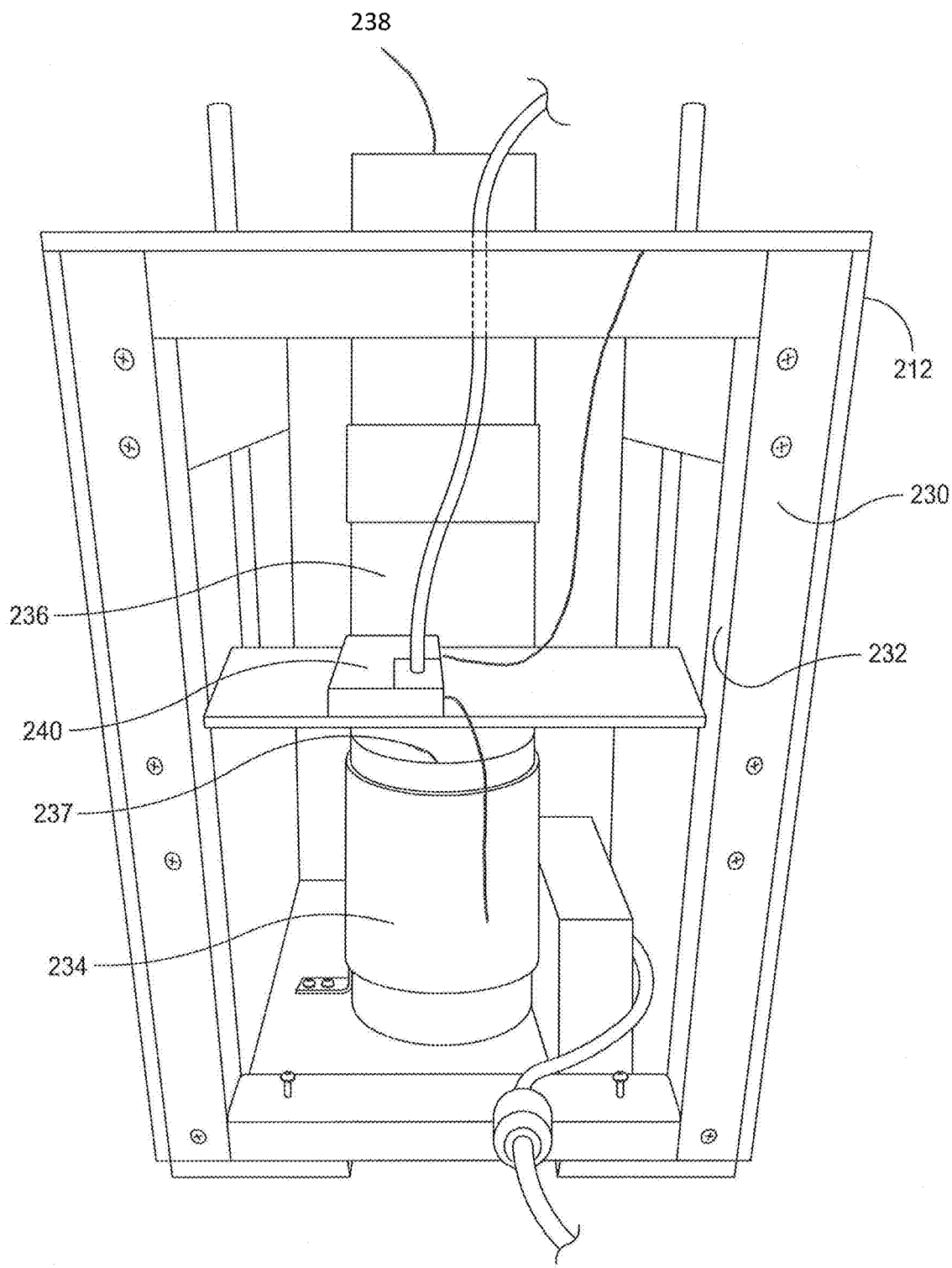
FIG. 6 is a partial rear perspective thereof.

FIG. 6 shows a rear perspective view of the base 212. The base includes a wall 230 having an inner surface 232. The base 212 includes an agitation device 234 that is secured to the inner surface 232 of the wall 230 by one or more fasteners and brackets, and is configured to direct air through a tube 236 towards the removable container.

The base 212 further includes a controller 240 that is secured to the inner surface 232 of the wall 230 and is in communication with the user interface. The controller 240 is configured to start, stop, and/or adjust an airflow generated by the agitation device 234. In one embodiment, the controller 240 can be configured to cooperate with the user interface, which is provided in one embodiment by the control buttons 222. In another embodiment, the user interface can embody a graphic user interface (GUI).

The agitation device 234 may be in the form of a fan, or other device for generating an airflow. In embodiments in which the agitation device 234 is a fan, the fan may include one or more blades. The agitation device 234 has an air intake and an air outlet. The air outlet is configured to direct airflow towards the tube 236.

The tube 236 directs airflow from the agitation device 234 towards the removable container. The tube 236 has a lower end 237 that is in sealing engagement with the agitation device 234 and an upper end 238 that forms a seat for receiving the removable container. In this way, at least substantially all of the airflow from the agitation device 234 is directed toward the removable container positioned on the seat.

When the removable container is placed on the seat at the upper end 238 of the tube, airflow is directed towards a lower end of the removable container. The removable container is configured with at least one vent to allow airflow from the tube to pass through the lower end of the removable container and agitate popcorn contained in the removable container. FIGS. 7-10 illustrate various embodiments of exemplary removable containers.

Figure 7:
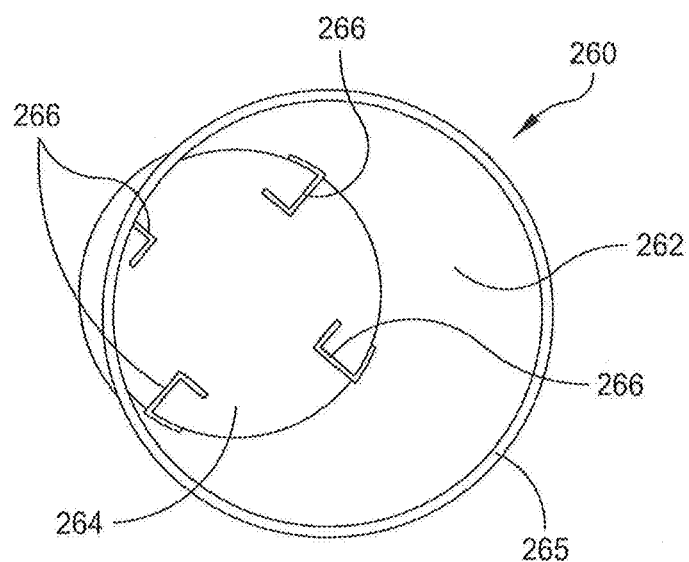
FIG. 7 is a perspective view of an embodiment of a container according to the present disclosure.
Figure 8:
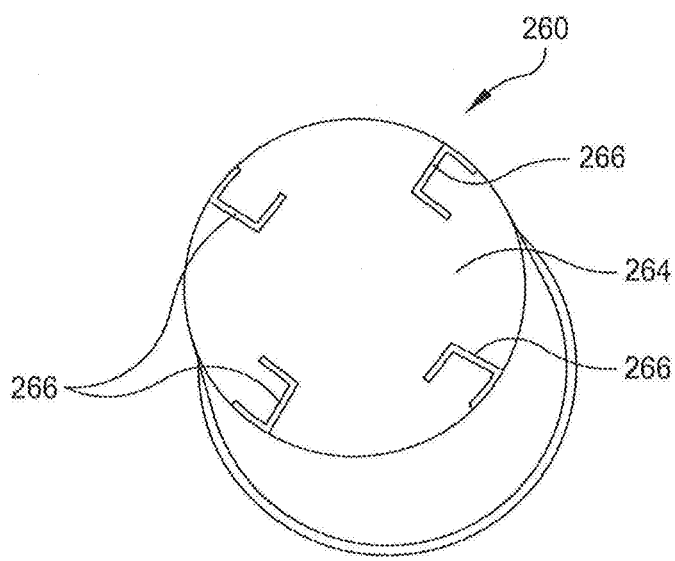
FIG. 8 is a lower perspective view of the container of FIG. 7.

In FIGS. 7 and 8, a removable container indicated generally at 260 has an outer side wall 262 that is connected to a lower wall 264. The removable container 260 has an open upper end 265. A plurality of vents, each indicated at 266, are formed in the lower wall 264. Each vent 266 is formed as a flap that is cut in the lower wall 264. In some embodiments, each flap may be formed by simply cutting one or more slits in the lower wall 264. In some embodiments, each flap is defined by three connecting linear slits in the lower wall 264, creating a rectangular flap that remains connected to the lower wall 264 along one length of the rectangle, as shown in FIGS. 7 and 8. When air is directed from the agitation device 234 towards the removable container 260, the air causes the flaps to deflect inwardly into the removable container 260. This allows air to flow through the lower wall 264 of the removable container 260 and aerate the popcorn.

Figure 9:
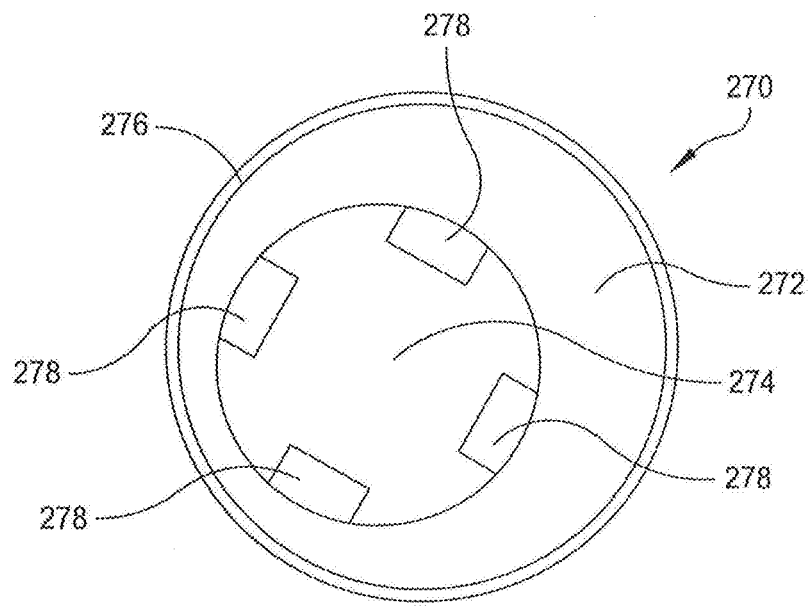
FIG. 9 is a perspective view an embodiment of a container according to the present disclosure.

In FIG. 9, a container indicated generally at 270 has an outer side wall 272 that is connected to a lower wall 274. The removable container 270 has an open upper end 276. A plurality of vents are formed in the lower wall. As with vents 266, the vents are formed as flaps that are cut in the lower wall 274 of the container 270. In some embodiments, the flaps may be formed by simply cutting slits in the lower wall. In some embodiments, each flap consists of three connecting linear slits in the lower wall 274, creating a rectangular flap that remains connected to the lower wall 274 along one length of the rectangle. In FIG. 9, each flap has a reinforcing body 278 that extends over the respective flap. The reinforcing body 278 biases the flap to a position in which the flap is substantially flush with the lower wall 274 of the container 270. The reinforcing body 278 extends over the edge of the flap to help prevent contents of the removable container 270 from exiting the removable container 270 through the respective vent. When air is directed from the agitation device 234 towards the removable container 270, the air causes the flaps to deflect inwardly into the removable container 270. This allows air to flow through the lower wall 274 of the removable container 270 and aerate the popcorn. In some embodiments, the reinforcing body 278 is made of a semi-rigid material, such as rubber, plastic, or paper. In some embodiments, the vents are formed by removing portions of the lower wall 274 and attaching the reinforcing body 278 to the lower wall 274, configured so as to allow the reinforcing body to act as a flap, substantially covering the opening created by removing portions of the lower wall 274 and deflecting inwardly into the removable container 270 and allowing air to flow through the lower wall 274 of the removable container 270 and aerate the popcorn.

Figure 10:
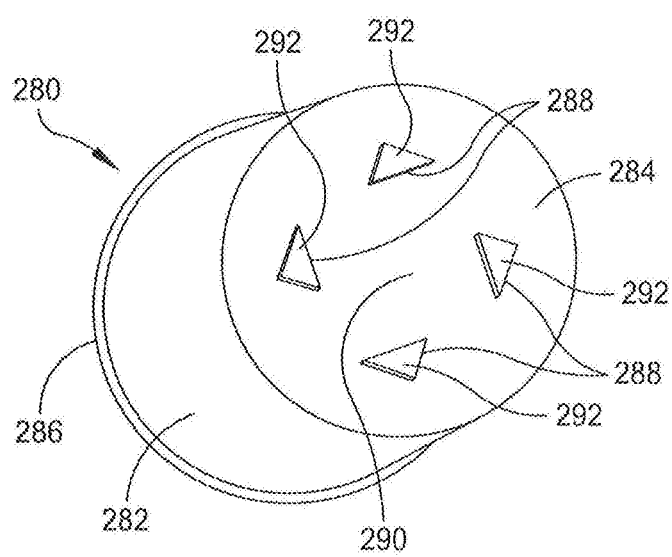
FIG. 10 is a perspective view of an embodiment of a container according to the present disclosure.

In FIG. 10, a removable container indicated generally at 280 has an outer side wall 282 that is connected to a lower wall 284. The removable container 280 has an open upper end 286. A plurality of vents, each indicated at 288, are formed in the lower wall. Each vent 288 is formed as an opening that is cut in the lower wall 284. In some embodiments, each opening may be formed by simply cutting a slit in the lower wall 284. In some embodiments, the openings may be formed by cutting the lower wall 284, removing material from the lower wall, and attaching a reinforcing body configured so as to allow the reinforcing body to act as a flap, substantially covering the opening created by removing portions of the lower wall 284 and deflecting inwardly into the removable container 280 and allowing air to flow through the lower wall 284 of the removable container 280 and aerate the popcorn. The openings of FIG. 10 are formed closer to a center 290 of the lower wall 284 of the removable container 280 relative to the locations of the flaps of the embodiment of FIG. 9. The location of the openings of FIG. 10 results in a different airflow through the removable container 280 than the airflow caused by the flaps of the removable container 270 of FIG. 9. The more centrally located openings of FIG. 10 result in more upward motion of the popcorn in the center of the removable container 280. Accordingly, a person of ordinary skill in the art can adjust the location of the flaps and/or openings on the lower wall to achieve a desired airflow in the removable container.

In FIG. 10, each vent has a reinforcing body 292 that extends over the respective vent. The reinforcing body 292 is biased to a position in which the reinforcing body 292 is substantially flush with the lower wall 284 of the container 280. The reinforcing body 292 extends over the edge of the vent to help prevent contents of the removable container 280 from exiting the removable container 280 through the respective vent 288. When air is directed from the agitation device 234 towards the removable container 280, the air causes the reinforcing bodies 292 to deflect inwardly into the removable container 280. This allows air to flow through the lower wall 284 of the removable container 280 and aerate the popcorn.

Figure 11:
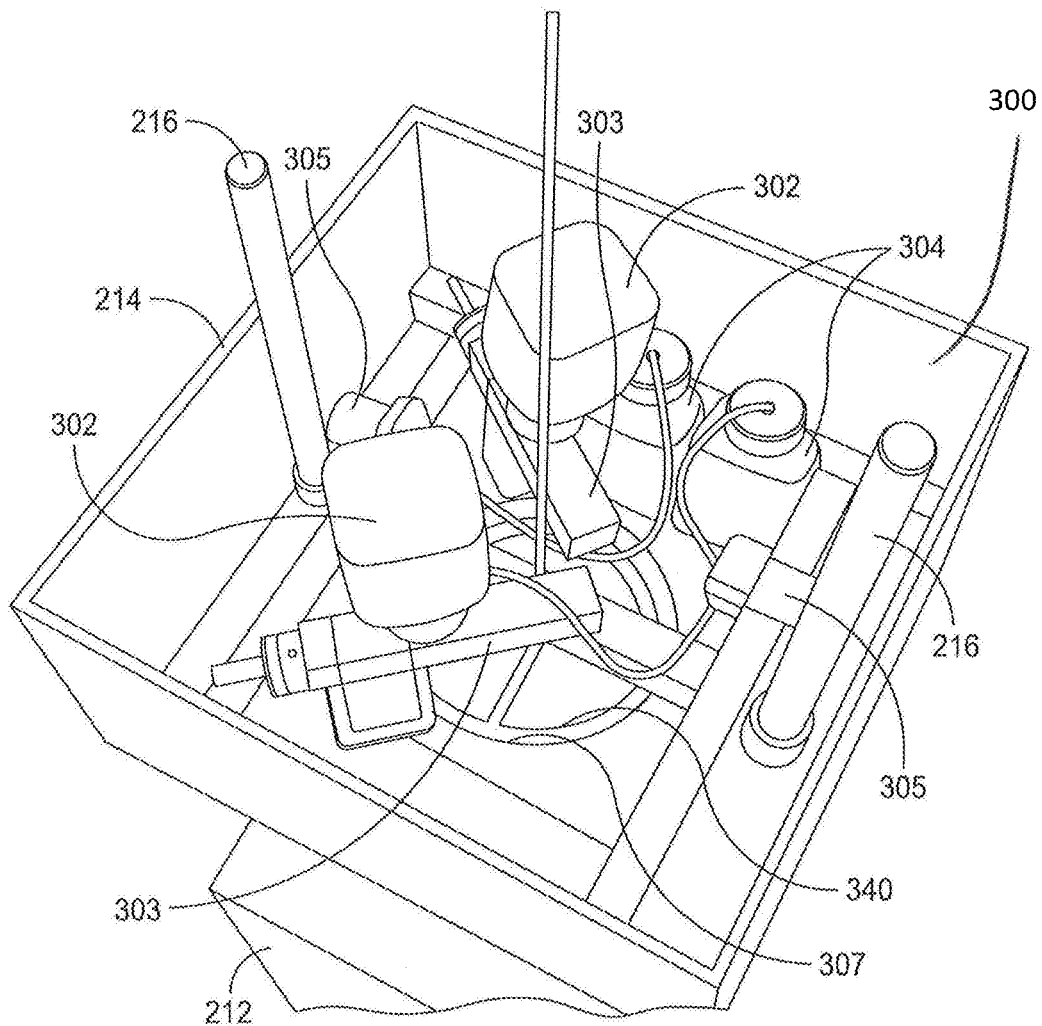
FIG. 11 is a partial perspective view of the flavoring apparatus of FIG. 5.

Referring to FIG. 11, the upper body 214 includes an internal compartment 300 that supports at least one reservoir and/or hopper for containing a flavoring agent. In FIG. 11, two hoppers, each indicated at 302, and two reservoirs, each indicated at 304, are secured within the internal compartment 300. Each hopper 302 may contain a solid, granular flavoring agent and is connected to an auger driven feeder 303 which, when activated, releases granular flavoring agent into the flavoring housing 218. Each reservoir 304 may contain a liquid flavoring agent, and is connected to a respective pump 305 via a tube. In some embodiments, the pump 305 is a peristaltic pump. When activated, each pump 305 releases liquid flavoring into the flavoring housing 218 via a second tube. The feeders 303 and pumps 305 are controlled by the controller 240, which is configured to start, stop, and/or adjust the application of the flavoring agent by the feeders 303 and pumps 305. The feeders 303 and the pumps 305 are configured to output the flavoring agent through the aperture 307 in the upper body 214, and into the flavoring housing 218. The controller 240 can be configured to cooperate with the user interface, which is provided in one embodiment by the control buttons 222, allowing a user to control the application of a flavoring agent to the popcorn. In another embodiment, the user interface can embody a graphic user interface (GUI).

The upper body 214 is slidably secured to posts 216 extending upwardly from the base 212. To insert or remove a removable container from the seat of the apparatus 200, a user can control the height of the upper body 214 relative to the base 212 by sliding the upper body 214 upwardly, along the posts 216. In some embodiments, the upper body 214 may be manually moved by a user. In some embodiments, the upper body 214 may be moved by a motor.

Figure 12:
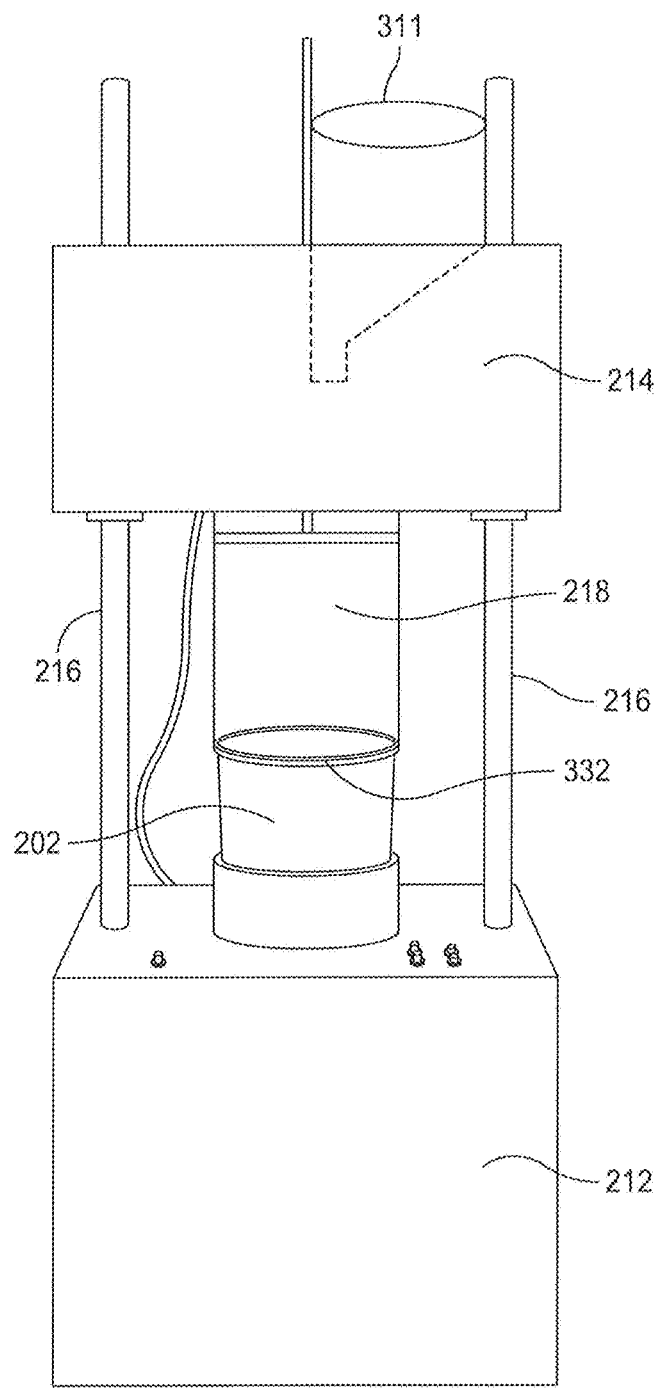
FIG. 12 is a front view of the flavoring apparatus of FIG. 5.

The housing 218 is secured to a lower end of the upper body 214 so that a change in height of the upper body 214 results in a corresponding change in height of the housing 218. The housing 218 has a lower end 332 that is configured to sealingly engage the open upper end of the side wall of a removable container 202, as shown in FIG. 12.

Figure 13:
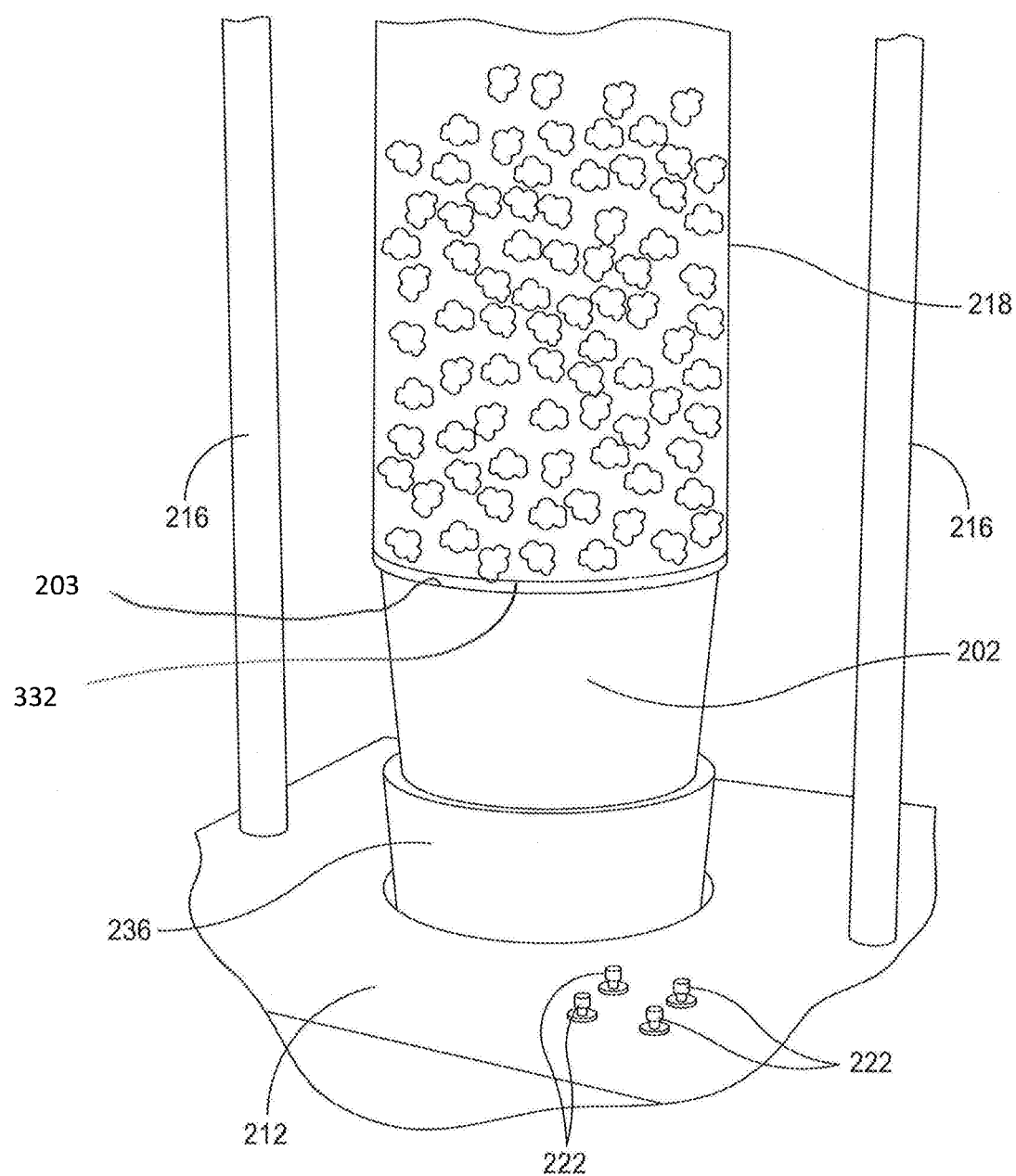
FIG. 13 is a partial front view of the flavoring apparatus of FIG. 5 while popcorn is being aerated.

A user can raise the height of the upper body 214 to allow a user to place a removable container on the seat of the base 212. Then the user can lower the height of the upper body 214 to cause the lower end 332 of the housing 218 to sealingly engage the open upper end 203 of the removable container 202, as shown in FIG. 13. Once the lower end 332 of the housing 218 sealingly engages the open upper end of the removable container, the user can instruct the user interface to cause the agitation device 234 to aerate the popcorn and can instruct the user interface to cause one or more of the feeders 303 and pumps 305 to apply flavoring agent to the aerated popcorn.

When a removable container is supported on the seat, a user can adjust the airflow through the removable container and can control the application of a flavoring agent to popcorn in the container. FIG. 13 shows the popcorn being aerated by the agitation device 234.

To adjust the airflow provided to the seat, a user interacts with the user interface, which is connected to the controller 240. In response to commands received from the user by the user interface, the controller 240 sends one or more signals to the agitation device 234 to turn the power of the agitation device 234 on or off and/or to adjust an airflow output of the agitation device 234.

To control the application of a flavoring agent to popcorn in the removable container, a user interacts with the user interface. In response to commands received from the user by the user interface, the controller 240 sends one or more signals to the feeders 303 and pumps 305 associated with the hoppers and/or reservoirs.

Figure 14:
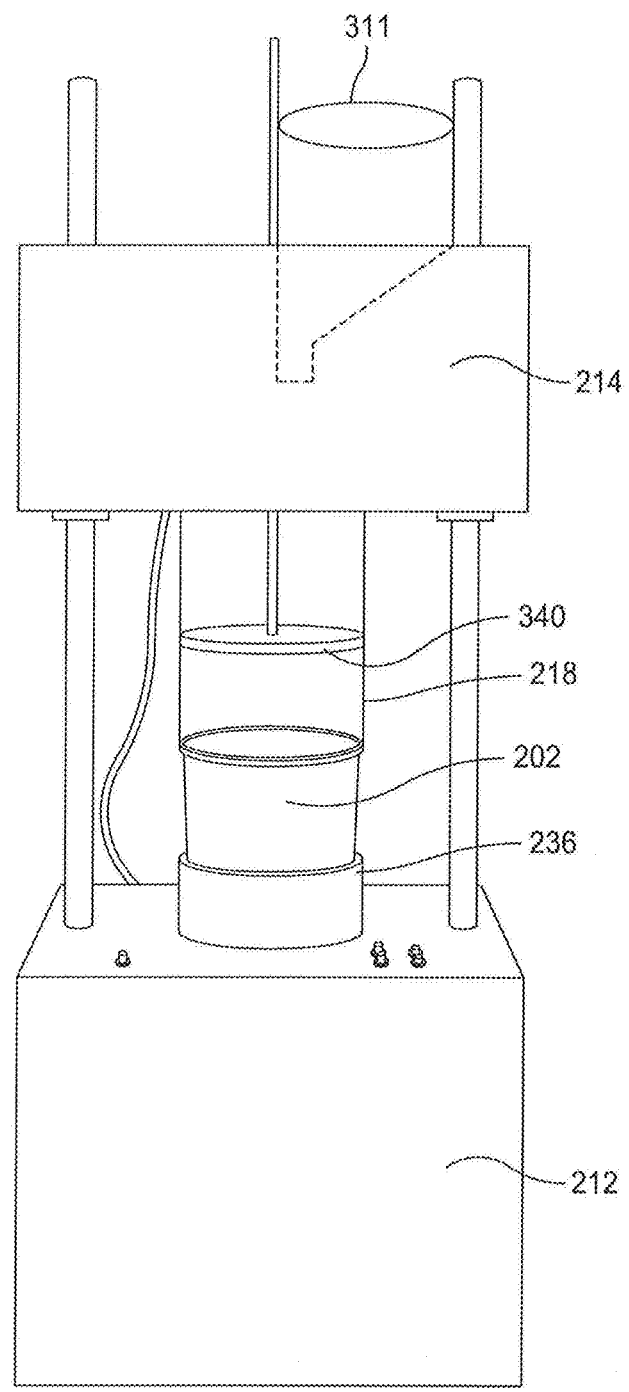
FIG. 14 is a front view of the flavoring apparatus of FIG. 5 during cleaning of the flavoring housing.

After the popcorn is flavored, and after the popcorn settles back into the removable container, a cleaning device 340 may be moved along the inner surface of the housing 218, as shown in FIG. 14. The cleaning device 340 operates in a similar manner to the cleaning device of the embodiment of FIGS. 1-3.

The apparatus includes a filling device 311 in the form of a popcorn dispenser that is configured to dispense popped popcorn into the removable container through the open upper end of the flavoring housing 218. The popcorn dispenser includes a lower funnel shaped portion configured to direct popcorn towards the open upper end of the flavoring housing. In some embodiments, dispensing of the popcorn by the popcorn dispenser can be controlled by the controller through either a wired or wireless connection. In some embodiments, the popcorn dispenser 311 includes a popcorn popper.

Referring to FIG. 15, a flavoring apparatus, generally indicated at 500, includes a unitary support structure 501, rather than a support structure that includes a lower portion connected to an upper portion. The flavoring apparatus is configured for use with a removable container 502. The flavoring apparatus 500 includes a flavoring housing 504 that may be similar to the flavoring housings described in relation to the embodiments of FIGS. 1-3 and FIGS. 5, 6, and 11-14. The flavoring apparatus 500 includes a tube 506 connected to an agitation device (not shown) that may be similar to the tubes and agitation devices described in relation to the embodiments of FIGS. 1-3 and FIGS. 5, 6, and 11-14. The flavoring apparatus 500 includes a user interface 508 that may be similar to the user interfaces described in relation to the embodiments of FIGS. 1-3 and FIGS. 5, 6, and 11-14.

According to another aspect of the present disclosure, a method of applying a flavoring agent to a flavor target is provided. In some embodiments, the method includes a step of providing a flavor target in a removable container. The method also includes a step of agitating the flavor target and causing the agitated flavor target to enter a housing. The method also includes a step of applying a flavoring agent to the flavor target.

Methods of the present disclosure may be used in combination with various structures of the present disclosure, such as the apparatus 100 of FIGS. 1-3 and the unit 400 of FIG. 4.

Example

In an exemplary embodiment of the invention, the flavoring apparatus comprises a base that is approximately 12 inches wide by 12 inches long and 24 inches high. The base is configured to receive a removable container, approximately 8 inches high with a top diameter of approximately 5.25 inches, a bottom diameter of approximately 3.875 inches and a volume of approximately 64 ounces. The removable container is made of sturdy, grease resistant paper and is a bucket, having a top opening the size of the top diameter and multiple bottom rectangular openings, approximately 0.25 inches by 0.5 inches, with one-way valves allowing for the introduction of air flows. The one-way valves are fashioned from the bucket by cutting slits along three of the four sides of the bottom openings, leaving the fourth side attached to create a flap that opens when air pressure is applied but otherwise remains closed. The removable container may contain a flavor target, such as popped popcorn, when it is introduced into the support. Housed in the support is an agitation device, comprising a fan with approximately 0.728 air horsepower (AHP) and capable of moving 728 cubic feet per minute (CFM) at speeds of up to 140 miles per hour (MPH). The fan's speed is variable, as needed to agitate the flavor target introduced into the removable container. When the removable container is introduced to the base, the agitation device is configured to blow air into the removable container through the bottom openings, thereby introducing air flows into the removable container, agitating the flavor target contained within. The apparatus further comprises a cylindrical flavoring housing, approximately 5 inches in diameter and 24 inches in height. The cylindrical flavoring housing has a bottom housing opening and a top housing opening, both approximately the size of its diameter, and is configured to receive the agitated flavor target when the removable container is substantially adjacent the bottom housing opening and the agitation device introduces the airflows into the removable container. The apparatus further comprises a flavoring device, located adjacent to the top housing opening. In this embodiment, this flavoring device comprising one or more peristaltic pumps and one or more powder dispensers that introduce various flavoring agents, including liquid agents and solid agents, into the housing for the purpose of flavoring the flavor target. One or more of the various flavoring agents can be added while the flavor target is being agitated by the agitation device or while the flavor target is stationary in the removable container. The apparatus further comprises a cleaning device to remove residual flavoring agent from the inside of the cylindrical housing. In this embodiment, the cleaning device comprising a semi-rigid plastic squeegee conformed to the diameter the housing and moves across a portion of the height of the housing, removing residual flavoring agent and depositing it in the removable container. The apparatus further comprises a user interface for controlling the agitation device and the flavoring device. In this embodiment, the user interface comprising various electrical switches, which activate the agitation device and the flavoring device to achieve the desired flavoring outcome.

In any of these embodiments, the apparatus may be configured to communicate with a computer network for the purposes of conveying information. This may include, for example, information on sales, information on consumption, information on the need for maintenance, or other information. Similarly, the apparatus may receive information from the computer network regarding its operations. This may be used to update certain software components of the apparatus and alter how the apparatus works.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method of applying a flavoring agent to a flavor target, the method comprising:
   positioning a removable container on a support structure of a food product flavoring apparatus;
   providing a flavor target in the removable container;
   introducing airflow into the removable container to agitate the flavor target, causing the agitated flavor target to enter a housing of the food product flavoring apparatus, the housing being positioned above the removable container when positioned on the support structure;
   applying a flavoring agent to the agitated flavor target;
   ceasing airflow causing the flavor target to settle back into the removable container;
   removing the removable container from the support structure of the food product flavoring apparatus; and
   removing residual flavoring agent from at least a portion of the housing.

2. The method of claim 1, wherein the flavoring agent is applied while the flavor target is agitated.

3. The method of claim 1, further comprising, prior to applying the flavoring agent, providing a plurality of flavoring agents from which a user may select which to apply.

4. The method of claim 1, wherein providing the flavor target in the removable container comprises providing the removable container without the flavor target and subsequently adding the flavor target to the removable container.

5. The method of claim 1, wherein the airflow is introduced into the removable container via openings in the removable container.

6. The method of claim 1, further comprising creating an opening in the removable container, through which the airflow is introduced.

7. The method of claim 1, wherein the airflow is created outside of the removable container.

8. The method of claim 1, wherein the airflow into the removable container to agitate the flavor target causes the agitated flavor target to enter a cylindrical housing.

9. The method of claim 1, wherein the flavor target is popcorn.

10. The method of claim 1, wherein the flavoring agent includes at least one of a spice, an oil, or a granulized cheese.

11. The method of claim 1, wherein a lower end of the housing is configured to sealingly engage an open upper end of the removable container.

12. A method of applying a flavoring agent to a flavor target, the method comprising:
    positioning a removable container on a support structure of a food product flavoring apparatus;
    providing a flavor target in the removable container;
    introducing airflow into the removable container to agitate the flavor target, causing the agitated flavor target to enter a housing of the food product flavoring apparatus, the housing being positioned above the removable container when positioned on the support structure;
    ceasing airflow causing the flavor target to settle back into the removable container;
    removing the removable container from the support structure of the food product flavoring apparatus; and
    applying a flavoring agent to the flavor target,
    wherein the airflow is introduced into the removable container via at least one one-way valve in the removable container.

13. The method of claim 12, wherein a lower end of the housing is configured to sealingly engage an open upper end of the removable container.

14. A method of applying a flavoring agent to a flavor target, the method comprising:
    positioning a removable container on a seat of a support structure of a support structure of a food product flavoring apparatus;
    providing a flavor target in the removable container;
    introducing airflow into the removable container to agitate the flavor target, causing the agitated flavor target to enter a housing of the food product flavoring apparatus, the housing being positioned above the removable container when positioned on the support structure;
    applying a flavoring agent to the flavor target; and
    ceasing airflow causing the flavor target to settle back into the removable container; and
    removing the removable container from the support structure of the food product flavoring apparatus.

15. The method of claim 14, further comprising, after removing the removable container containing the flavored flavor target from the seat, positioning a subsequent removable container containing a subsequent batch of a flavor target on the seat.

16. The method of claim 14, wherein a lower end of the housing is configured to sealingly engage an open upper end of the removable container.

17. A method of applying a flavoring agent to a flavor target, the method comprising:
    positioning a removable container on a support structure of a food product flavoring apparatus;
    providing a flavor target in the removable container;
    sealingly engaging an open upper end of the removable container to a lower end of a housing, the housing being positioned above the removable container when positioned on the support structure;
    introducing airflow into the removable container to agitate the flavor target, causing the agitated flavor target to enter a housing;
    applying a flavoring agent to the flavor target;
    ceasing airflow causing the flavor target to settle back into the removable container; and
    removing the removable container from the support structure of the food product flavoring apparatus.

18. The method of claim 17, further comprising, after the flavoring agent has been applied to the flavor target, disengaging the removable container from the housing.

* * * * *